US009762917B2

(12) United States Patent
Zheng et al.

(10) Patent No.: US 9,762,917 B2
(45) Date of Patent: *Sep. 12, 2017

(54) QUANTIZATION METHOD AND APPARATUS IN ENCODING/DECODING

(71) Applicant: HUAWEI TECHNOLOGIES CO.,LTD., Shenzhen, Guangdong (CN)

(72) Inventors: Jianhua Zheng, Beijing (CN); Jianwen Chen, Beijing (CN); Yun He, Beijing (CN); Xinjian Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,948

(22) Filed: Dec. 30, 2015

(65) Prior Publication Data

US 2016/0198162 A1   Jul. 7, 2016

Related U.S. Application Data

(60) Division of application No. 12/210,890, filed on Sep. 15, 2008, now Pat. No. 9,258,568, which is a (Continued)

(30) Foreign Application Priority Data

Mar. 16, 2006   (CN) .......................... 2006 1 0064857

(51) Int. Cl.
*H04N 7/12*    (2006.01)
*H04N 11/02*   (2006.01)
(Continued)

(52) U.S. Cl.
CPC ......... *H04N 19/174* (2014.11); *H04N 19/126* (2014.11); *H04N 19/154* (2014.11);
(Continued)

(58) Field of Classification Search
CPC ....................................................... H04N 7/50
See application file for complete search history.

(56) References Cited

U.S. PATENT DOCUMENTS 6,044,115 A    3/2000 Horiike et al.
6,067,118 A *  5/2000 Chen .................. H04N 19/60
                                             375/240.03
(Continued)

FOREIGN PATENT DOCUMENTS

CN    1187730 A    7/1998
CN    1216887 A    5/1999
(Continued)

OTHER PUBLICATIONS

ITU-T H.264, Series H: Audiovisual and Multimedia Systems, Infrastructure of audiovisual services—Coding of moving video, Advanced video coding for generic audiovisual services, Mar. 2005, total 343 pages.
(Continued)

*Primary Examiner* — Chikaodili E Anyikire

(57) ABSTRACT

A method and apparatus is provided for encoding/decoding an image in a process of transmission. A plurality of frequency bands are divided into different frequency zones; a scaling value is assigned for each frequency zone; a scaling matrix is established with coefficients comprising the scaling values for the different frequency zones; wherein a number of the frequency zones is smaller than a number of coefficients in the matrix, and each frequency zone corresponds to one scaling value in the coefficient matrix such that every coefficient in said each frequency zone has the same scaling value that is assigned to said frequency bands; and corresponding quantization/dequantization is performed in process of encoding/decoding respectively using the scaling matrix.

13 Claims, 4 Drawing Sheets

Related U.S. Application Data continuation of application No. PCT/CN2007/000862, filed on Mar. 16, 2007.

(51) Int. Cl.
| | |
|---|---|
| *H04N 11/04* | (2006.01) |
| *H04N 19/174* | (2014.01) |
| *H04N 19/176* | (2014.01) |
| *H04N 19/70* | (2014.01) |
| *H04N 19/46* | (2014.01) |
| *H04N 19/61* | (2014.01) |
| *H04N 19/126* | (2014.01) |
| *H04N 19/154* | (2014.01) |
| *H04N 19/18* | (2014.01) |
| *H04N 19/177* | (2014.01) |

(52) U.S. Cl.
CPC ......... *H04N 19/176* (2014.11); *H04N 19/177* (2014.11); *H04N 19/18* (2014.11); *H04N 19/46* (2014.11); *H04N 19/61* (2014.11); *H04N 19/70* (2014.11)

(56) References Cited

U.S. PATENT DOCUMENTS

| | | | |
|---|---|---|---|
| 6,157,746 A | 12/2000 | Sodagar et al. | |
| 6,348,945 B1 | 2/2002 | Hayakawa | |
| 6,407,972 B1* | 6/2002 | Koyata | G11B 27/034 369/47.1 |
| 6,438,167 B1 | 8/2002 | Shimizu et al. | |
| 6,509,929 B1 | 1/2003 | Ishikawa | |
| 6,628,709 B2 | 9/2003 | Lin et al. | |
| 6,687,412 B1 | 2/2004 | Rao et al. | |
| 6,792,044 B2 | 9/2004 | Peng et al. | |
| 6,959,116 B2* | 10/2005 | Sezer | G06T 9/007 375/240.03 |
| 7,912,122 B2 | 3/2011 | Kadono et al. | |
| 2001/0021222 A1 | 9/2001 | Shen et al. | |
| 2002/0172279 A1 | 11/2002 | Peng et al. | |
| 2003/0011793 A1* | 1/2003 | Nishikawa | G06T 9/00 358/1.9 |
| 2004/0258318 A1 | 12/2004 | Yu et al. | |
| 2006/0133479 A1 | 6/2006 | Chen et al. | |
| 2006/0177143 A1 | 8/2006 | Winger | |
| 2007/0189626 A1* | 8/2007 | Tanizawa | H04N 19/176 382/251 |
| 2008/0089410 A1 | 4/2008 | Lu et al. | |

FOREIGN PATENT DOCUMENTS

| | | |
|---|---|---|
| CN | 1223057 A | 7/1999 |
| CN | 1462555 A | 12/2003 |
| WO | 9835503 A1 | 8/1998 |

OTHER PUBLICATIONS

Jungwoo Lee, Rate-Distortion Optimization of Parametrized Quantization Matrix for MPEG-2 Encoding, 1998, total 4 pages.

Wax et al, "Efficient Inversion of Toeplita-Block Toeplita Matrix", IEEE Transaction on Acoustics, Speech and Signal Processing, vol. ASSP-31, No. 5, pp. 1218-1221(Oct. 1983), XP009002659. total 4 pages.

Sreeram et al., "Note on the Hankel Matrix", Electronics Letter, vol. 27, No. 4, pp. 362-364(Feb. 14, 1991), XP000219853. total 4 pages.

Eberly, "On Efficient Band Matrix Arithmetic", Proceedings of the 33rd Annual Symposium on Foundations of Computer Science (FOCS 1992) pp. 457-463(Oct. 24, 1992) XP10029664. total 8 pages.

AVS-X WD3.0—Information technology—Advanced coding of audio and video-part 2: Video, General Administration of Duality Supercision, Inspection and Quarantine Issued, Mar. 2006, National Standards of the People's Repulic of China, China. total 110 pages.

\* cited by examiner

QUANTIZATION METHOD AND APPARATUS IN ENCODING/DECODING

CROSS-REFERENCE TO RELATED APPLICATION

This application is a divisional application of U.S. patent application Ser. No. 12/210,890, filed Sep. 15, 2008, which is a continuation of International Patent Application No. PCT/CN2007/000862, filed Mar. 16, 2007, which claims priority to Chinese Patent Application No. 200610064857.5, filed Mar. 16, 2006, each of which is hereby incorporated by reference in its entirety.

FIELD OF THE INVENTION

The present invention relates to image encoding, and in particular, to quantization technology in encoding/decoding.

BACKGROUND OF THE INVENTION

In imaging encoding technology, transformed coefficients are quantized by using a quantization matrix. The quantized result is then subjected to entropy encoding to produce a compressed bitstream. The quality of the encoded image can be controlled by adjusting the coefficients in the quantization matrix.

The image may include a stationary picture, a frame of moving pictures, a residual picture of two adjacent pictures of moving pictures, or a target picture resulted from performing computation on any one of moving pictures.

During encoding procedure, the quantization of transformed coefficients is normally carried out via a quantization matrix. For example, the quantization can be done using the following equation:

$$Q(i,j) = \left\lceil \frac{Coe(i,j)}{QM(i,j)} \right\rceil \quad (1)$$

where, $Coe(i,j)$ is the value of the $(i,j)$ pixel of a transformed picture block, which is referred to as transformed coefficient in short; QM is a quantization matrix, $QM(i,j)$ is a coefficient value of the quantization matrix, $Q(i,j)$ stands for the quantized and rounded value of the transformed coefficient $Coe(i,j)$, in which $Q(i,j)$ is referred to as quantized coefficient in short, and $\lceil \cdot \rceil$ is a round operation.

Details of different regions in a picture represent different frequency features of the picture, and the human's eyes have different subjective perception for different parts of a picture; thus, different quantization methods conforming to the human's eyes' characteristic should be applied respectively according to different picture contents.

Presently, quantization of encoded pictures is implemented with a constant quantization matrix in the image encoding standards of JPEG (Joint Photographic Experts Group), MPEG (Moving Picture Experts Group), MPEG-2 and MPEG-4, and so on. In these standards, the quantization matrix is set in the picture header for JPEG, while for MPEG-1, MPEG-2 and MPEG-4, the quantization matrix is set in the sequence header. Therefore, for a sequence of pictures, each sequence has a quantization matrix according to the MPEG standards. In other words, quantization of the pictures in the entire sequence is performed with a single fixed quantization matrix.

When a human watches a picture, the evaluation of the picture quality is achieved and based on the subjective picture quality capable of being perceived by the human's eyes. Thus, a better subjective picture quality can be obtained by employing quantization methods conforming to the human visual characteristics. This means that an appropriate quantization matrix has to be selected for the different pictures in a sequence to obtain a satisfying subjective quality for the encoded picture sequence.

However, picture contents in a sequence are not always the same, rather, variations and details of each picture in a picture sequence are significantly different from each other. As a result, applying a single quantization matrix to all the pictures in the sequence cannot achieve the best subjective picture quality for the encoded pictures.

Therefore, in the H.264/AVC standard, both the sequence header and the picture header include user-defined quantization matrices, so as to select an appropriate quantization matrix at a picture level for different video pictures since picture contents in a sequence vary significantly.

Several representative quantization matrices in the currently image/video coding standards are described briefly below.

Quantization Matrix in JPEG

In the JPEG standard, there is only one size of discrete cosine transform (DCT), that is, an 8×8 transform, the quantization matrix is thus also an 8×8 matrix, and there are totally 64 quantization coefficients. Different quantization matrices are used for the luminance component and chroma component of a picture. The quantization matrix for the luminance component is:

$$QM\_Y = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix};$$

The quantization matrix for the chroma component is:

$$QM\_C = \begin{bmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{bmatrix}.$$

All the coefficients of the JPEG quantization matrices are set in the picture header, and there is one luminance quantization matrix and one chroma quantization matrix for each picture.

(2) MPEG-2

In the MPEG-2 standard, there is only one size of DCT, that is, an 8×8 transform, the quantization matrix is thus also an 8×8 matrix, and there are totally 64 quantization coefficients. Intra-frame quantization matrix and inter-frame quantization matrix are applied while encoding picture, where the intra-frame quantization matrix is:

$$QM\_INTRA = \begin{bmatrix} 8, & 16, & 19, & 22, & 26, & 27, & 29, & 34, \\ 16, & 16, & 22, & 24, & 27, & 29, & 34, & 37, \\ 19, & 22, & 26, & 27, & 29, & 34, & 34, & 38, \\ 22, & 22, & 26, & 27, & 29, & 34, & 37, & 40, \\ 22, & 26, & 27, & 29, & 32, & 35, & 40, & 48, \\ 26, & 27, & 29, & 32, & 35, & 40, & 48, & 58, \\ 26, & 27, & 29, & 34, & 38, & 46, & 56, & 69, \\ 27, & 29, & 35, & 38, & 46, & 56, & 69, & 83, \end{bmatrix};$$

The inter-frame quantization matrix is:

$$QC\_INTER = \begin{bmatrix} 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \\ 16, & 16, & 16, & 16, & 16, & 16, & 16, & 16, \end{bmatrix}.$$

In MPEG-2, only one intra-frame quantization matrix and only one inter-frame quantization matrix are available for all the pictures in each sequence, and all of the 64 coefficients are set in the sequence header. MPEG-2 also allows for a user-defined quantization matrix, which is set in the sequence header extension.

(3) H.264/AVC

In the H.264/AVC standard, there are two DCT sizes: 8×8 and 4×4, and thus there are two sets of quantization matrices of 8×8 and 4×4 correspondingly. For the 8×8 quantization matrix, totally 64 coefficients are used for quantization scaling of different frequency components; for the 4×4 quantization matrix, totally 16 coefficients are used for quantization scaling of different frequency components.

In High Profile of H.264/AVC standard, quantization matrices exist in both the sequence header and picture header. There exists quantization matrices corresponding to the 4×4 and 8×8 blocks. Thus, H.264/AVC High Profile not only allows all the pictures in each sequence to have the same quantization matrix but also allows different pictures in the same sequence to have different quantization matrices, though only one quantization matrix can be used during encoding one image of the same sequence.

The quality of the encoded picture is thus flexibly controlled by adjusting the quantization matrix during the video encoding.

The quality control of an encoded image is carried out by adjusting the coefficients of quantization matrices in the sequence header and image header.

The quantization matrix has a size of M×N (M, N=2, 4, 8, 16 or other size). There are different quantization matrices for different transform sizes.

Presently, all the coefficient values or transformed values of the coefficient values in a quantization matrix are included in the sequence header or picture header during the video encoding. The coefficient values of the quantization matrix are the values corresponding to the transforming coefficient of the picture block. For each transformed coefficient of the picture block, there exists a corresponding quantization coefficient in the quantization matrix. Similarly, the transformed values of the quantization matrix coefficients refer to weighting/scaling values in quantization matrix or transformed values of weighting/scaling values in quantization matrix, such as differential values from a default quantization matrix.

It can be seen from the above quantization processes of the individual encoding method that, during the practical application, it is necessary to adjust a value corresponding to each frequency component in the quantization matrix so as to control the image quality, which increases the processing complexity. On the other hand, an overhead is caused when transferring the corresponding matrix coefficients, which affects the image encoding efficiency and transferring performance.

SUMMARY OF THE INVENTION

The embodiments of the present invention provide a quantization method and apparatus in encoding/decoding, which makes it possible to implement quantization by writing a few parameters in the bit stream. It effectively improves the encoding efficiency and guarantees the subjective quality of the encoded picture.

An embodiment of the present invention provides a quantization method in encoding/decoding, including:

assigning a frequency band parameter for each frequency zone of coefficient matrix that are divided into several frequency zones, assigning a frequency band distribution parameter for a certain distribution of the frequency band parameters in the above coefficient matrix, and uniquely establishing a parameter model corresponding to the above coefficient matrix, according to the frequency band parameters and the frequency band distribution parameter;

acquiring from the parameter model values of the band parameters as well as a value of the band distribution parameter corresponding to the distribution configuration of the band parameters and then computing band weighting coefficients;

performing computation on the coefficient matrix using the frequency band weighting coefficients to produce an updated coefficient matrix; and performing quantization/dequantization in the encoding/decoding procedure, respectively, using the updated coefficient matrix.

An embodiment of the present invention provides a quantization method for implementing quantization in encoding, including:

generating a bitstream parameter in the encoded bitstream according to model parameter information corresponding to a parameter model, where the parameter model uniquely corresponds to a coefficient matrix, and the method to establish the parameter model including, assigning a frequency band parameter for each frequency zone of a coefficient matrix that are divided into several frequency zones, assigning a frequency band distribution parameter corresponding to a certain distribution of the frequency band parameters in the coefficient matrix, and then establishing the parameter model according to the frequency band parameters and the frequency band distribution parameter, in which, the model parameter includes the frequency band parameters and the frequency band distribution parameter; and writing the bitstream parameter into the header of a separable encoding unit.

An embodiment of the present invention provides a method for implementing dequantization in decoding, including:

determining a coefficient matrix according to the bitstream parameters in the header of an encoding unit, wherein the bitstream parameters are generated according to model parameters information corresponding to a parameter model, and the parameter model uniquely corresponds to a coefficient matrix, wherein the method to establish the parameter model including, assigning a frequency band parameter for each frequency zone of a coefficient matrix, assigning a frequency band distribution parameter corresponding to a certain distribution of the frequency band parameters in the above coefficient matrix, and then the parameter model is established uniquely corresponding to the coefficient matrix by the predetermined frequency band parameters and frequency band distribution parameter;

performing dequantization on the encoded unit using the coefficient matrix.

An embodiment of the present invention provides a parameterized quantization apparatus at an encoding end, where the apparatus includes:

a quantization parameter model memory, configured to store model parameter information included in a parameter model necessary for the encoding end, the model parameter includes frequency band parameters and a frequency band distribution parameter for a coefficient matrix, the parameter model is established by assigning the frequency band parameter for each frequency zone of a frequency band coefficient matrix, assigning the frequency band distribution parameter corresponding to a certain distribution of the frequency band parameters in the coefficient matrix, and establishing the parameter model according to the frequency band parameters and the frequency band distribution parameter;

a parameter weighting quantization processor, configured to acquire the model parameter stored in the quantization parameter model memory and performing quantization on picture data according to the model parameter;

a model bitstream parameter processor, configured to convert the model parameters used in quantization by the parameter weighting quantization processor to bitstream parameters, and write the bitstream parameters into the header of a separable encoding unit.

An embodiment of the present invention provides a parameterized dequantization apparatus at a decoding end, where the apparatus includes:

a model bitstream parameter processor, configured to read bitstream parameters from a bitstream and determine a corresponding model parameters according to the bitstream parameters;

a quantization parameter model memory, configured to store model parameter information acquired by the model bitstream parameter processor, wherein the model parameter includes frequency band parameters and a frequency band distribution parameter for a coefficient matrix;

a parameter weighting dequantization processor, configured to obtain the model parameter information from the quantization parameter model memory, and perform dequantization on picture data by using the model parameter.

It is seen from the parameterized quantization technology provided by the embodiments of the present invention that it is possible to acquire the quantization matrix in the lower level encoding unit using a few bits in the higher level encoding unit, by writing a few parameters in the bitstream during encoding. Moreover, the encoding efficiency is improved because of saving encoding bits, while the subjective quality of the encoded picture is improved.

DETAILED DESCRIPTION OF THE EMBODIMENTS

According to embodiments of the present invention, on one hand, an encoded picture quality can be controlled through a parameter model, and the quality of picture regions on which human's eyes concentrate can be improved. On the other hand, according to embodiments of the present invention, a quantization matrix can be obtained from the syntax of a lower level encoding unit by increasing little bit overhead in syntax of a higher level encoding unit.

Figure 1A:
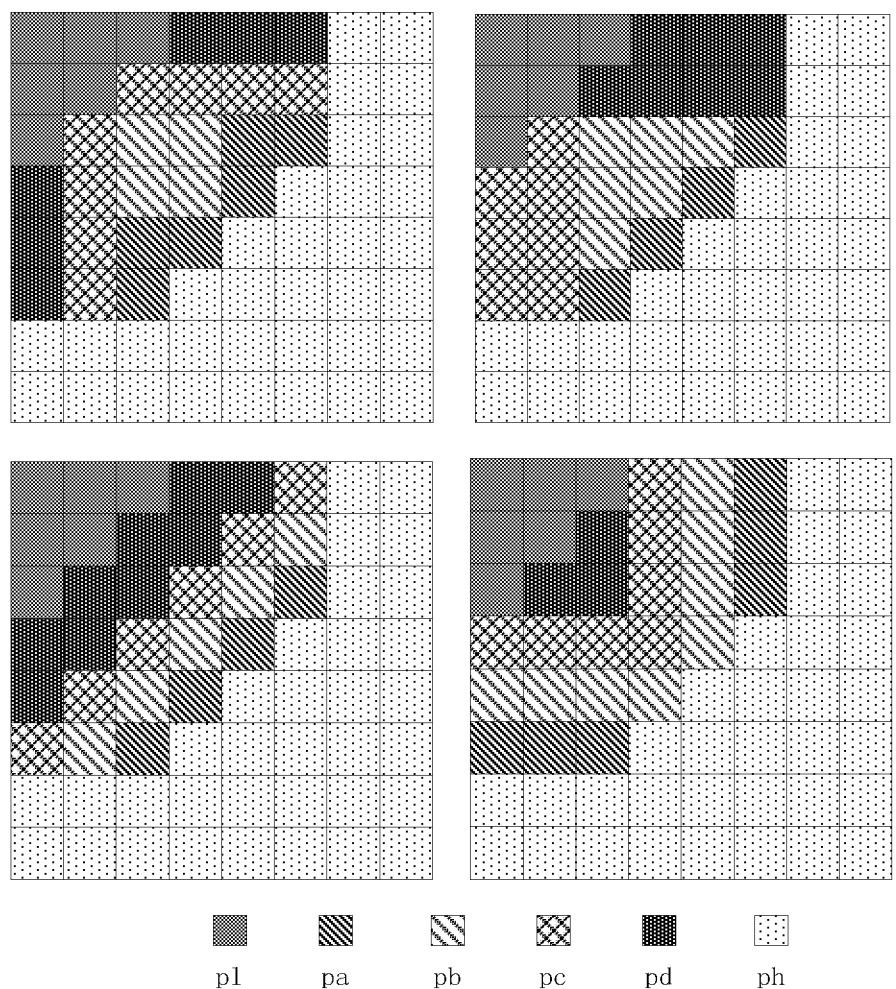
FIG. 1(a) is a first schematic diagram of a model parameter distribution configuration of an embodiment of the present invention.

As shown in FIG. 1(a), specifically, according to an embodiment of the present invention, various frequency bands of transformed coefficients are modeled as a parameter model represented by a plurality of parameters. The parameter model includes a frequency band parameter distribution configuration (i.e. stand by a frequency band distribution parameter) and frequency band parameters. Where, the frequency band parameter distribution configuration can be a number or an index, which represents different distributions of frequency band parameter or an index set of the frequency band parameters within a matrix, or a location set of the frequency band parameters distributed within the matrix. The frequency band parameters refer to a set of values for different bands which can indicate all the weighting coefficients on the corresponding bands. The band parameter can be a number or an index, representing the frequency weighting value and indicating the weighting is positive or negative, where the weighting coefficient Coe is defined as:

$$\begin{cases} Coe > T & \text{positive weighting} \\ Coe < T & \text{negative weighting} \end{cases}$$

where T is a predefined threshold. A weighting value greater than the threshold is a positive weighting, and a weighting value smaller than the threshold is a negative weighting. The quality of certain region interesting to the human's eyes in a picture can be improved by weighting the frequencies, so as to improve the quality of images that human's eyes concern.

An embodiment of the present invention provides a method for implementing quantization in encoding and decoding, the detailed steps are described below.

(1) First, frequency band information of a quantization matrix is modeled as a parameter model.

The frequency band information of the quantization matrix includes the partition of the quantization matrix into frequency band, the frequency band parameters assigned to each bands of the quantization matrix, and the distribution of values in frequency bands in the quantization matrix, and so on. In other words, the quantization matrix is partitioned into bands, and the partitioned band regions are represented with parameters. The distribution of the band parameters is represented with a pattern structure. The parameter model includes but is not limited to information such as frequency band parameter distribution configuration (i.e. frequency band distribution parameter) and frequency band parameter values.

(2) Next, quantization weighting coefficients, i.e., weighting coefficients in different frequency band, are computed using the predetermined parameter model.

Specifically, the frequency band parameter distribution configuration and the values of the frequency band parameters are determined according to the parameter model corresponding to the modeled quantization matrix, and the quantization weighting coefficients in different frequency band are computed according to the frequency band parameter distribution configuration and the values of the frequency band parameters.

The quantization weighting coefficients comprise positive weighting and negative weighting; the positive weighting indicates that the transformed coefficient is enhanced after weighting, and the negative weighting indicates that the transformed coefficient is reduced after weighting.

(3) Finally, the initial quantization matrix of the step (1) is updated using the computed quantization weighting coefficients, thereby generating a new quantization matrix, which is in turn used to quantize the transformed coefficients of picture.

Specifically, new quantization values in different frequency band are obtained by weighting the initial quantization matrix with the quantization weighting coefficients in frequency bands according to the frequency band distribution configuration, and then the initial quantization matrix is updated to a weighted quantization matrix. The transformed coefficients of picture are quantized using the updated quantization matrix. Weighting on the quantization matrix includes but is not limited to arithmetic operations of addition, subtraction, multiplication, division, shifting and filtering.

An embodiment of the present invention provides a method of encoding/decoding a bitstream using a parameter model, the method includes specifically the following steps:
A. Processing at an Encoding End or a Bitstream Transmitting End (1) Firstly, bitstream parameters are computed by using a parameter model or transformed values of the parameter model.

Specifically, the model parameters are acquired from a determined parameter model. The model parameters include but are not limited to a distribution configuration of frequency bands, values of the frequency band parameters etc. The model parameters are transformed to the corresponding bitstream parameters, wherein the transform is to convert a parameter set A into a parameter set B suitable for bitstream storage; that is, $B\{x_1, x_2, \ldots, x_M\}=\Psi(A\{x_1, x_2, \ldots x_N\})$, where, M, N are the parameter number in the parameter set before and after the transforming, M and N can be equal or unequal to each other, the transform $\Psi$ must be a reversible transform, that is, $A\{x_1, x_2, \ldots x_N\}=\Psi^{-1}(B\{x_1, x_2, \ldots x_M\})$.

Next, the bitstream parameter is written to the header of an encoding unit.

Specifically, the bitstream parameter corresponding to the parameter model is written to the header of the encoding unit, each bitstream parameter is assigned with several bits, where:

the number of assigned bits can be constant or variable;

the encoding unit is a separable unit in bitstream structure including but not limited to a sequence, a picture group, a picture, a slice, a macroblock, etc.;

the header of the encoding unit refers to the header syntax of the encoding unit in bitstream structure, such as a sequence header, a picture group header, a picture header, a slice header or a macroblock header etc.

B. Processing at a Decoding End or a Bitstream Receiving End

The model parameters corresponding to the encoding unit are determined according to the bitstream parameters in the encoding unit. The coefficient matrix corresponding to the encoding unit is then determined according to the method of establishing a parameter model, and the encoding unit is quantized using the coefficient matrix.

For example, a quantization matrix is computed as default quantization matrix for pictures in a sequence according to the bitstream parameter with several bits written in the sequence header, and a quantization matrix is computed separately for each picture in a sequence according to the bitstream parameter with several bits written in each picture header in the sequence.

At the bitstream receiving end, a bitstream parameter acquired from the header of a higher level encoding unit can be taken as a reference into computing the bitstream parameter of a lower level encoding unit, and the coefficient matrix corresponding to the lower level encoding unit is then determined, the coefficient matrix can be used to quantize the corresponding lower level encoding unit.

The higher level and lower level encoding units are independently encoded bitstream units, and the lower level encoding unit is a subset of the higher level encoding unit, or a subset of the subset of the higher level encoding unit. For example, a slice is a subset of a picture, a macroblock is a subset of a slice, and a macroblock is a subset of the subset of a picture.

An example of taking the bitstream parameter of the higher level encoding unit as the reference into computing the bitstream parameter of the lower level encoding unit is as follows:

(1) The macroblock of a picture can be allocated with a default quantization matrix in picture level according to the bitstream parameter with several bits written to the picture header. That is, model parameters of picture level can be determined according to the bitstream parameter in the picture header, and the quantization matrix for each macroblock can be computed with reference to the model parameters of picture level. Specifically, the quantization matrix for the macroblock is directly computed by using the bitstream parameter in the picture header; or, model parameters for the macroblock are converted from the bitstream parameters in the picture header, according to information on the macroblock (such as energy information) and in a predefined transform method, and then the quantization matrix for the macroblock is computed according to the model parameters for the macroblock.

(2) The picture level model parameter can be determined according to the bitstream parameter with several bits written to the picture header. A quantization matrix for a certain region of the picture can be computed with reference to the model parameter of picture level. Specifically, the quantization matrix for a picture region is computed directly by using the model parameter, or, region model parameters for the picture region are converted from the model parameter of picture level with a predefined method according to the information on the picture region (such as energy information of the region), and then the quantization matrix for the picture region is computed. Thus, a specific picture region can have an independent quantization matrix without any more bits stored in encoded bitstream of that region. The region of picture includes but is not limited to a block, a macroblock, a slice and a specific object (i.e., a designated object) etc.

In order to facilitate the understanding of the embodiments of the present invention, a detailed description of an embodiment is given below with reference to FIG. 2.

Figure 2:
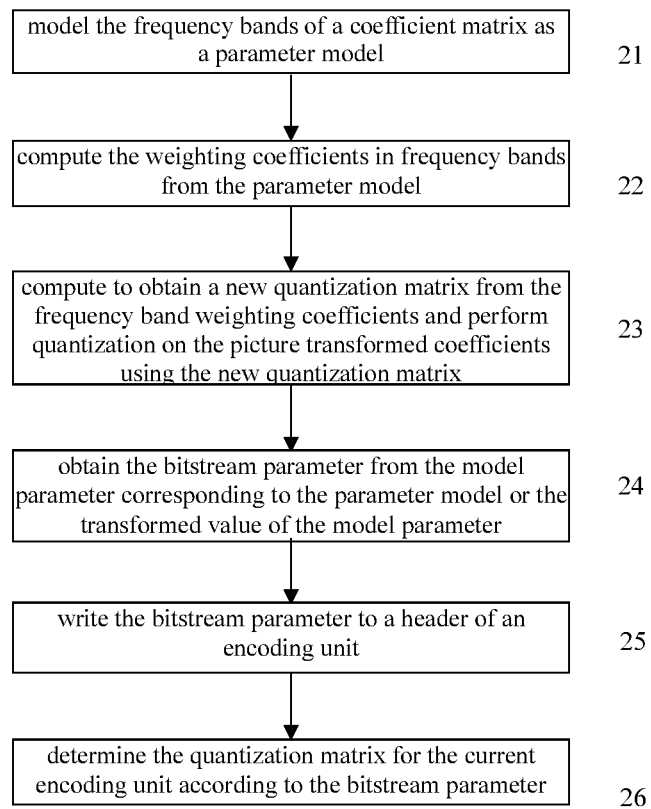
FIG. 2 is a schematic flowchart of a method according to an embodiment of the present invention.

The quantization of a parameter model during the encoding/decoding according to an embodiment of the present invention is shown in FIG. 2, specifically including the following steps:

The processing at the encoding end includes:

Step 21: The quantization matrix is partitioned into several bands is modeled as a parameter model;

The coefficients of the quantization matrix are partitioned into a plurality of bands according to the characteristic of the transformed coefficients of picture and features of the human vision system, each band represents different frequency part of coefficients in matrix. The matrix can be partitioned into bands as positive weighting zone, negative weighting zone and unchanged zone; alternatively, it can also be partitioned based on the values of transformed coefficients or values of transformed coefficients in different frequency parts. The size of a coefficient block can be M×N (M, N=2, 4, 8, 10, or other number). A parameter is assigned to each frequency band of the transformed coefficients. A band distribution parameter is assigned to certain distribution configuration of different frequency band parameters in the transformed coefficient matrix;

Step 22: The weighting coefficients in frequency bands are computed from the parameter model;

Step 23: A new quantization matrix is obtained by updating an initial quantization matrix with the frequency band weighting coefficients, and the updated quantization matrix is used to quantize the transformed coefficients of picture;

Step 24: The bitstream parameters are obtained from the model parameters or the transformed values of the model parameters corresponding to the parameter model;

Step 25: The bitstream parameters are written to the header syntax of the encoding unit;

That is, during encoding, the model parameters are converted into a bitstream parameters corresponding to the model parameters through a parameter set mapping and the bitstream parameters is stored in the header syntax of the encoding unit;

The processing at the decoding end includes:

Step 26: The quantization matrix for the current macroblock is determined from the bitstream parameter in the received bitstream.

That is, during decoding, the bitstream of model parameter is first retrieved from the header of the encoding unit, and each bit of bitstream parameter corresponding to the model is obtained according to the definition of bitstream syntax structure; the original model parameter is recovered using inverse mapping from parameter set, and the weighting coefficient matrix is computed using the distribution parameter of frequency bands, frequency band parameters, as well as indication of positive or negative weighting in the parameter model. The weighting coefficient matrix is applied to the quantization matrix to obtain an updated quantization matrix. An independent quantization matrix can be computed for each encoding unit such as a macroblock.

In the following, to facilitate understanding of the embodiments of the present invention, several distribution configurations of the frequency band parameters will be described with reference to FIG. 1(*a*), in which parameter models with block size of 8×8 and 6 frequency band parameters are illustrated. Each distribution configuration of frequency band parameter corresponds to an individual sort of frequency band partition, that is, corresponds to a distribution parameter of frequency band, symbol as q_mode. In the same distribution configuration, each frequency band is assigned with a parameter, thus, a parameterized quantization model (parameter model) can be uniquely determined by the frequency band distribution parameter q_mode and the frequency band parameters (p1~ph).

Example 1 for the Model of Parameterized Quantization

FIG. 1(*a*) shows an example model of parameterized quantization with matrices size of 8×8, 6 band parameters (q_para[i], i=1, . . . , 6) and 4 band distribution parameters (q_mode=0, . . . , 3).

In other words, in FIG. 1(*a*), 6 parameters (p1, pa, pb, pc, pd, ph) are assigned to represent 6 frequency bands. The positions of the parameters (p1, pa, pb, pc, pd, ph) in each of the 8×8 matrices are different and correspond to one type of frequency band distribution model. The distribution model is designated with the band distribution parameter q_mode.

For example, FIG. 1(*a*) lists 4 sorts of frequency band distribution model, that is, the band distribution parameter can have a value of 0, 1, 2 or 3.

Hence, the corresponding quantization model is expressed as:

$$WQ_{x,y}[i]=(q\_mode, q\_para[i])\ i=1\ldots 6,$$
$$x,y=0\ldots 7;$$

or, $$WQ_{x,y}[i]=(q\_para[i], q\_mode)\ i=1\ldots 6,$$
$$x,y=0\ldots 7.$$

Where, WQ represents a weighting quantization parameter matrix, i is the band index of quantization coefficients that are group into six bands, that is, the index of weighting quantization parameter. x, y are the position of the weighting quantization parameters in the matrix WQ, the values of x, y are determined by the frequency band distribution model indicated by q_mode. Reference can be made to FIG. 1(*a*) for details.

Example 2 for the Model of Parameterized Quantization

FIG. 1(*b*) shows an example model of parameterized quantization with 8×8 matrices, 7 band parameters (q_para[i], i=1, . . . , 7) and 4 band distribution parameters.

In other words, FIG. 1(*b*) shows an example of distribution configurations with 7 frequency band parameters, where 7 parameters (pdc, p1, pa, pb, pc, pd, ph) represent 7 frequency bands. In this case, the corresponding parameterized quantization models are expressed as:

$$WQ_{x,y}[i]=(q\_mode, q\_para[i])\ i=1\ldots 7, x,y=0\ldots 7;$$

or, $$WQ_{x,y}[i]=(q\_para[i], q\_mode)\ i=1\ldots 7, x, y=0\ldots 7.$$

Thus, a parameterized quantization model with n band parameters can be expressed as:

$$WQ_{x,y}[i]=(q\_mode,q\_para[i]), i=1 \ldots n, x=0 \ldots M-1, y=0 \ldots N-1 \quad (2)$$

or, $$WQ_{x,y}[i]=(q\_para[i],q\_mode)\ i=1 \ldots n, x=0 \ldots M-1, y=0 \ldots N-1 \quad (3)$$

where n<M×N (M,N=2, 4, 8, 16 or other size, M, N are the sizes of the transformed coefficient matrix or quantization matrix).

Example 3 for the Model of Parameterized Quantization

FIG. 1(a) shows an example model of parameterized quantization with 8×8 matrices, 4 sorts of configuration for 6 band parameters (q_para[i], i=1, . . . 6), hereby, 4 band distribution parameters (q_mode=0, . . . , 3);

Where, q_para[i], i(=1 . . . n) is a set of frequency band parameters, a parameter set is determined by providing a set of values for q_para[i], i=1 . . . n. The index of the parameter set is designated by $wq\_param_k$.

Taking the 6-band parameter model of FIG. 1(a) as an example, a parameter set with different frequency band parameters can be obtained for different values of the frequency band parameter (p1, pa, pb, pc, pd, ph), such as:

First set of band parameters : $wq\_param_1 = (p1_1, pa_1, pb_1, pc_1, pd_1, ph_1)$
= (128, 98, 106, 116, 116, 128)

Second set of band parameters : $wq\_param_2 = (p1_2, pa_2, pb_2, pc_2, pd_2, ph_2)$
= (135, 143, 143, 160, 160, 213)

Third set of band parameters : $wq\_param_3 = (p1_3, pa_3, pb_3, pc_3, pd_3, ph_3)$
= (128, 167, 154, 141, 141, 128)

Fourth set of band parameters : $wq\_param_4 = (p1_4, pa_4, pb_4, pc_4, pd_4, ph_4)$
= (122, 115, 115, 102, 102, 78)

Therefore, a parameterized quantization model with n band parameters can be expressed in the following form of a parameter set index, that is:

$$WQ_{x,y}[i]=(q\_mode,wq\_param_k), \text{where, } k=1 \ldots K, \text{being the index of the parameter set, } x=0 \ldots M-1, y=0 \ldots N-1; \quad (4)$$

Or $$WQ_{x,y}[i]=(wq\_param_k,q\_mode), \text{where, the subscript } k=1 \ldots K \text{ being the index of the parameter set, } x=0 \ldots M-1, y=0 \ldots N-1. \quad (5)$$

In FIG. 1(a), assuming that q_mode=0, that is, the first configuration for parameter distribution of FIG. 1(a) is used, for the first set of parameters wq_param$_1$=(128,98,106, 116,116,128), the corresponding quantization parameter model WQ$_{x,y}$[i] with 8×8 matrix, 6 band parameters is expressed as:

$$WQ_{x,y}[i]=(q\_mode,wq\_param_1)=(0,128,98,106,116, 116,128) \quad (6)$$

or $$WQ_{x,y}[i]=(wq\_param_1,q\_model)=(128,98,106,116, 116,128,0) \quad (7)$$

According to the first configuration of parameter distribution, for that q_mode equals to 0, the frequency band weighting coefficient matrix corresponding to the quantization parameter model expressed in Equations (6) or (7) is expressed as:

$$[coe]=\begin{bmatrix} 128 & 128 & 128 & 116 & 116 & 116 & 128 & 128 \\ 128 & 128 & 116 & 116 & 116 & 116 & 128 & 128 \\ 128 & 116 & 106 & 106 & 98 & 98 & 128 & 128 \\ 116 & 116 & 106 & 106 & 98 & 128 & 128 & 128 \\ 116 & 116 & 98 & 98 & 128 & 128 & 128 & 128 \\ 116 & 116 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix} \quad (8)$$

In FIG. 1(a), assuming that q_mode equals to 1, that is, the second configuration of parameter distribution in FIG. 1(a) is used, for the second set of parameters wq_param$_2$= (135,143,143,160,160,213), the corresponding quantization parameter model WQ$_{x,y}$[i] with 8×8 matrix, 6 band parameters is expressed as:

$$WQ_{x,y}[i]=(q\_mode,wq\_param_2)=(1,135,143,143,160, 160,213) \quad (9)$$

or $$WQ_{x,y}[i]=(wq\_param_2,q\_mode)=(135,143,143,160, 160,213,1) \quad (10)$$

For the quantization parameter model expressed in Equations (9) or (10), the second configuration of parameter distribution, that is, q_mode equals to 1, hereby the corresponding frequency band weighting coefficient matrix is:

$$[coe]=\begin{bmatrix} 135 & 135 & 135 & 160 & 160 & 160 & 213 & 213 \\ 135 & 135 & 160 & 160 & 160 & 160 & 213 & 213 \\ 135 & 160 & 143 & 143 & 143 & 143 & 213 & 213 \\ 160 & 160 & 143 & 143 & 143 & 213 & 213 & 213 \\ 160 & 160 & 143 & 143 & 213 & 213 & 213 & 213 \\ 160 & 160 & 143 & 213 & 213 & 213 & 213 & 213 \\ 213 & 213 & 213 & 213 & 213 & 213 & 213 & 213 \\ 213 & 213 & 213 & 213 & 213 & 213 & 213 & 213 \end{bmatrix} \quad (11)$$

For the first set of parameter wq_param$_1$=(128,98,106, 116,116,128) and the second set of parameter wq_param$_2$= (135,143,143,160,160,213) as well as the four sorts of configuration of parameter distribution in FIG. 1(a), corresponding eight sorts of frequency band weighting coefficient matrices are listed in the following:

For the first set of parameters, wq_param$_1$, and q_mode = 0 ... 3

$Coe(\text{wq\_param}_1 q\_mode = 0) =$ $$\begin{bmatrix} 128 & 128 & 128 & 116 & 116 & 116 & 128 & 128 \\ 128 & 128 & 116 & 116 & 116 & 116 & 128 & 128 \\ 128 & 116 & 106 & 106 & 98 & 98 & 128 & 128 \\ 116 & 116 & 106 & 106 & 98 & 128 & 128 & 128 \\ 116 & 116 & 98 & 98 & 128 & 128 & 128 & 128 \\ 116 & 116 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

$Coe(\text{wq\_param}_1 q\_mode = 1) =$ $$\begin{bmatrix} 128 & 128 & 128 & 116 & 116 & 116 & 128 & 128 \\ 128 & 128 & 116 & 116 & 116 & 116 & 128 & 128 \\ 128 & 116 & 106 & 106 & 106 & 98 & 128 & 128 \\ 116 & 116 & 106 & 106 & 98 & 128 & 128 & 128 \\ 116 & 116 & 106 & 98 & 128 & 128 & 128 & 128 \\ 116 & 116 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

$Coe(\text{wq\_param}_1 q\_mode = 2) =$ $$\begin{bmatrix} 128 & 128 & 128 & 116 & 116 & 116 & 128 & 128 \\ 128 & 128 & 116 & 116 & 116 & 106 & 128 & 128 \\ 128 & 116 & 116 & 116 & 106 & 98 & 128 & 128 \\ 116 & 116 & 116 & 106 & 98 & 128 & 128 & 128 \\ 116 & 116 & 106 & 98 & 128 & 128 & 128 & 128 \\ 116 & 106 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

$Coe(\text{wq\_param}_1 q\_mode = 3) =$ $$\begin{bmatrix} 128 & 128 & 128 & 116 & 106 & 98 & 128 & 128 \\ 128 & 128 & 116 & 116 & 106 & 98 & 128 & 128 \\ 128 & 116 & 116 & 116 & 106 & 98 & 128 & 128 \\ 116 & 116 & 116 & 116 & 106 & 128 & 128 & 128 \\ 106 & 106 & 106 & 106 & 128 & 128 & 128 & 128 \\ 98 & 98 & 98 & 126 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

For the second set of parameters, wq_param$_2$, and q_mode = 0 ... 3

$Coe(\text{wq\_param}_2 q\_mode = 0) =$ $$\begin{bmatrix} 135 & 135 & 135 & 160 & 160 & 160 & 213 & 213 \\ 135 & 135 & 160 & 160 & 160 & 160 & 213 & 213 \\ 135 & 160 & 143 & 143 & 143 & 143 & 213 & 213 \\ 160 & 160 & 143 & 143 & 143 & 213 & 213 & 213 \\ 160 & 160 & 143 & 143 & 213 & 213 & 213 & 213 \\ 160 & 160 & 143 & 213 & 213 & 213 & 213 & 213 \\ 213 & 213 & 213 & 213 & 213 & 213 & 213 & 213 \\ 213 & 213 & 213 & 213 & 213 & 213 & 213 & 213 \end{bmatrix}$$

$Coe(\text{wq\_param}_2 q\_mode = 2) =$ $$\begin{bmatrix} 135 & 135 & 135 & 160 & 160 & 160 & 213 & 213 \\ 135 & 135 & 160 & 160 & 160 & 143 & 213 & 213 \\ 135 & 160 & 160 & 160 & 143 & 143 & 213 & 213 \\ 160 & 160 & 160 & 143 & 143 & 213 & 213 & 213 \\ 160 & 160 & 143 & 143 & 213 & 213 & 213 & 213 \\ 160 & 143 & 143 & 213 & 213 & 213 & 213 & 213 \\ 213 & 213 & 213 & 213 & 213 & 213 & 213 & 213 \\ 213 & 213 & 213 & 213 & 213 & 213 & 213 & 213 \end{bmatrix}$$

$Coe(\text{wq\_param}_2 q\_mode = 1) =$ $$\begin{bmatrix} 135 & 135 & 135 & 160 & 160 & 160 & 213 & 213 \\ 135 & 135 & 160 & 160 & 160 & 160 & 213 & 213 \\ 135 & 160 & 143 & 143 & 143 & 143 & 213 & 213 \\ 160 & 160 & 143 & 143 & 143 & 213 & 213 & 213 \\ 160 & 160 & 143 & 143 & 213 & 213 & 213 & 213 \\ 160 & 160 & 143 & 213 & 213 & 213 & 213 & 213 \\ 213 & 213 & 213 & 213 & 213 & 213 & 213 & 213 \\ 213 & 213 & 213 & 213 & 213 & 213 & 213 & 213 \end{bmatrix}$$

$Coe(\text{wq\_param}_2 q\_mode = 3) =$ $$\begin{bmatrix} 135 & 135 & 135 & 160 & 143 & 143 & 213 & 213 \\ 135 & 135 & 160 & 160 & 143 & 143 & 213 & 213 \\ 135 & 160 & 160 & 160 & 143 & 143 & 213 & 213 \\ 160 & 160 & 160 & 160 & 143 & 213 & 213 & 213 \\ 143 & 143 & 143 & 143 & 213 & 213 & 213 & 213 \\ 143 & 143 & 143 & 213 & 213 & 213 & 213 & 213 \\ 213 & 213 & 213 & 213 & 213 & 213 & 213 & 213 \\ 213 & 213 & 213 & 213 & 213 & 213 & 213 & 213 \end{bmatrix}$$

Embodiment 1: Bitstream Encoding/Decoding According to a Quantization Parameter Model At the Encoding End:

It is assumed that the model of parameterized quantization is expressed by Equation (2), according to the 6-parameter model shown in FIG. (1a) and assuming that the header of the encoding unit is a picture header, the processing at the encoding end specifically includes the following steps:

(1) The frequency band weighting coefficients are computed by using the model parameter (q_mode, q_para[i]) i=1 ... 6. Assuming the weighting value threshold T equals to 10, hence a positive weighting is set when q_para[i] is greater than T, and a negative weighting is set when it is smaller than T.

For example, the 6-parameter weighting quantization model for the distribution configuration that q_mode equals to 0 is:

$(q\_mode=0, q\_para[1\sim6])=(0, 0, 3, 2, 1, 1, -1);$ the band parameters are: q_para[1~6]=(10, 13, 12, 11, 11, 9).

(2) A new quantization matrix is computed by using the weighting coefficients of frequency bands, and the updated new quantization matrix is used to perform quantization.

The matrix of frequency band weighting coefficient is obtained from (q_mode, q_para[i]) i=1 ... 6, which is:

$$[coe] = \begin{bmatrix} 10 & 10 & 10 & 11 & 11 & 11 & 9 & 9 \\ 10 & 10 & 12 & 12 & 12 & 12 & 9 & 9 \\ 10 & 11 & 12 & 12 & 13 & 13 & 9 & 9 \\ 11 & 11 & 12 & 12 & 13 & 9 & 9 & 9 \\ 11 & 11 & 13 & 13 & 9 & 9 & 9 & 9 \\ 11 & 11 & 13 & 9 & 9 & 9 & 9 & 9 \\ 9 & 9 & 9 & 9 & 9 & 9 & 9 & 9 \\ 9 & 9 & 9 & 9 & 9 & 9 & 9 & 9 \end{bmatrix}$$

If the weighting coefficient matrix is applied through multiplication, then QM*=QM×[coe], where QM* is the updated quantization matrix.

(3) The band distribution parameter q_mode of the weighting quantization parameter model and the frequency band parameters q_para[1~6] are converted into the bitstream parameters corresponding to the weighting quantization parameter model. It is assumed that the bitstream is encoded with entropy coding method, for example, se(v);

Thus, (q_mode=0,q_para[1~6])=(0, 0, 3, 2, 1, 1, −1), and encoded with se(v) code.

(4) The encoded bitstream parameters of weighting quantization parameter model are written to the picture_header.

At the Decoding End:

The processing at the decoding end corresponding to the encoding described previously includes:

(1) The model parameters is extracted and parsed from the picture header: (q_mode, q_para[i]) i=1 ... 6=(0, 0, 3, 2, 1, 1, −1).

(2) The matrix of frequency band weighting coefficients, [coe], is obtained from the model parameters (q_mode, q_para[1~6]), for example, q_mode equals to 0, q_para [1~6]) equals to (0, 0, 3, 2, 1, 1, −1), respectively.

(3) The quantization matrix QM* for the current picture is computed by QM*=QM×[coe] from the frequency band weighting coefficient matrix [coe], thus obtaining a picture level adaptive quantization matrix.

Embodiment 2: Bitstream Encoding/Decoding According to a Quantization Parameter Model At the Encoding End:

It is assumed that the parameterized quantization model is expressed by Equation (4), according to the 6-parameter model shown in FIG. (1a) and assuming that the header of the encoding unit is a picture header, the processing at the encoding end specifically includes the following steps:

(1) The frequency band weighting coefficients are computed by using the quantization parameter model $WQ_{x,y}[i]$=(q_mode, wq_param$_k$), where, k=1 ... K. x=0 ... M−1, y=0 ... N−1.

Assuming the weighting value threshold T equals to 128, a positive weighting is set when q_para[i] is greater than 128, and negative weighting is set when it is smaller than 128.

For example, for the distribution configuration that q_mode equals to 0, the parameter set used is wq_param$_1$= (128, 98, 106, 116, 116, 128), that is, the 6-parameter weighting quantization model with the parameter set index of 1 is:

$WQ_{x,y}[i]$=(q_mode,wq_param$_1$)=(0, 128, 98, 106, 116, 116, 128)

Thus, the frequency band parameter is wq_param$_1$=(128, 98, 106, 116, 116, 128).

If T (equals to 128) is taken as the threshold for all of the 6 weighting parameters, the model parameters to be written in bitstream can be expressed as: (q_mode=0, q_para[1~6])=(0, 0, −30, −22, −12, −12, 0);

(2) A new quantization matrix is computed by using the frequency band weighting coefficients, and the updated new quantization matrix is used to perform quantization. The matrix of frequency band weighting coefficients is obtained from $WQ_{x,y}[i]$=(q_mode, wq_param$_1$), which is:

$$[coe] = \begin{bmatrix} 128 & 128 & 128 & 116 & 116 & 116 & 128 & 128 \\ 128 & 128 & 116 & 116 & 116 & 116 & 128 & 128 \\ 128 & 116 & 106 & 106 & 98 & 98 & 128 & 128 \\ 116 & 116 & 106 & 106 & 98 & 128 & 128 & 128 \\ 116 & 116 & 98 & 98 & 128 & 128 & 128 & 128 \\ 116 & 116 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

Assuming that the weighting coefficient matrix is applied via multiplication, then QM*=QM×[coe], where, if QM is the quantization matrix, then QM* is the updated quantization matrix; if QM is a scaling matrix, then QM* is the updated scaling matrix;

(3) The frequency band distribution parameter q_mode of weighting quantization model and the band parameters q_para[1~] are converted into the bitstream parameters corresponding to the weighting quantization model, thus q_mode equals to 0, and q_para[1~6]) equals to (0, 0, −30, −22, −12, −12), respectively, then the bitstream is encoded with entropy coding method, for example, se(v).

(4) The encoded bitstream parameters q_mode, q_para [1~6] of the weighting quantization parameter model are written to the picture_header; alternatively, instead the encoded bitstream parameters q_mode, wq_param1 of the weighting quantization parameter model can also be written to the picture_header.

At the Decoding End:

The processing at the decoding end corresponding to the encoding processing includes:

(1) The model bitstream parameters is extracted and parsed from the picture header: q_mode, wq_param$_1$) or (q_mode, q_para[i]) i=1 ... 6=(0, 0, −30, −22, −12, −12, 0).

(2) The matrix of frequency band weighting coefficient, [coe], is obtained from the model bitstream parameter (q_mode, q_para[1~6]), for example (q_mode=0, q_para [1~6])=(0, 0, −30, −22, −12, −12, 0).

Assuming that T (for example, equals to 128) is set as the threshold for all of the 6 weighting parameters, the decoded band parameter is:

wq_param$_1$=(128,98,106,116,116,128).

And the decoded quantization parameter model is:

$WQ_{x,y}[i]$=(q_mode,wq_param$_1$)=(0,128,98,106,116,116,128).

The matrix of frequency band weighting coefficient [coe] is computed according to the quantization parameter model, which is:

$$[coe] = \begin{bmatrix} 128 & 128 & 128 & 116 & 116 & 116 & 128 & 128 \\ 128 & 128 & 116 & 116 & 116 & 116 & 128 & 128 \\ 128 & 116 & 106 & 106 & 98 & 98 & 128 & 128 \\ 116 & 116 & 106 & 106 & 98 & 128 & 128 & 128 \\ 116 & 116 & 98 & 98 & 128 & 128 & 128 & 128 \\ 116 & 116 & 98 & 128 & 128 & 128 & 128 & 128 \\ 128 & 128 & 128 & 128 & 128 & 128 & 128 & 128 \\ 128 & 128 & 128 & 128 & 128 & 128 & 128 & 128 \end{bmatrix}$$

(3) The updated inverse quantization matrix or inverse scale matrix QM* for the current frame is computed by QM*=QM×[coe] according to the band weighting coefficient matrix [coe];

If QM is the inverse quantization matrix, QM* is the updated inverse quantization matrix; if QM is the inverse scaling matrix, QM* is the updated inverse scaling matrix.

Figure 3:
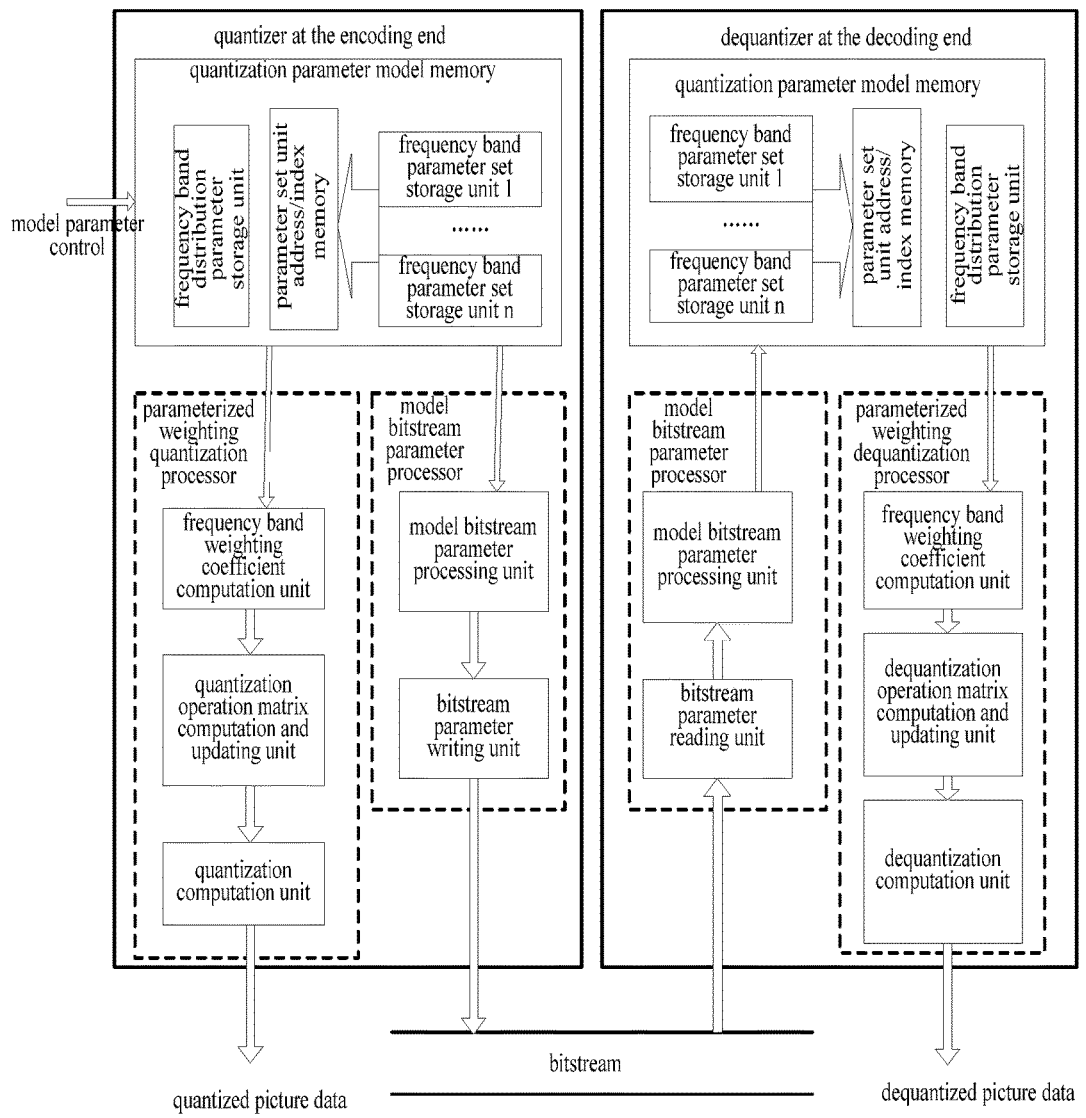
FIG. 3 is a schematic diagram of a system according to an embodiment of the present invention.

An embodiment of the present invention also provides a parameterized quantization apparatus used in image encoding/decoding, the structure of the apparatus is shown in FIG. 3, which includes specifically a parameterized quantizer at the encoding end (i.e., a parameterized quantization apparatus at the encoding end) and a parameterized quantizer at the decoding end (i.e., a parameterized quantization apparatus at the decoding end). The details of both apparatuses are described below.

A. Parameterized Quantizer at the Decoding End

Figure 1B:
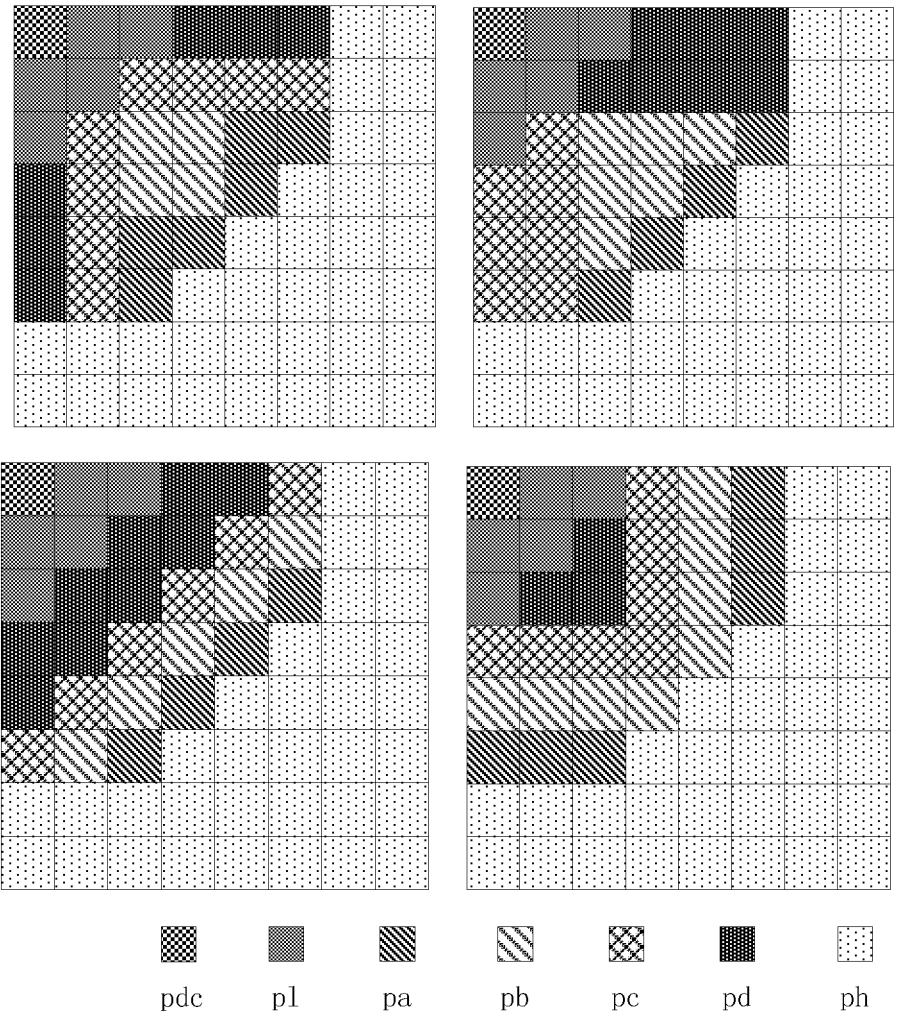
FIG. 1(b) is a second schematic diagram of a model parameter distribution configuration of an embodiment of the present invention.

The Parameterized quantizer is used for performing parameterized weighting quantization at the encoding end, and includes mainly a parameterized weighting quantization processor, a quantization parameter model memory and a bitstream parameter processor of the quantization parameter model, where, (1). Quantization Parameter Model Memory The quantization parameter model memory is configured to store parameters of the quantization parameter model necessary for the encoding end, specifically including:

a plurality of band parameter set storage units, configure to store the frequency band parameters at the encoding end, each set of frequency band parameter used in the different frequency band of coefficient matrix is stored in one of the band parameter set storage units. The number of the band parameter set storage units depends on the number of the band parameters sets to be stored. In the quantizer at the encoding end, the number of the band parameter set storage units can be increased or decreased when necessary.

a parameter set address/index storage unit, configured to store address information of all the band parameter set storage units at the encoding end. The quantization parameter model memory can read the values of a set of band parameters stored in the band parameter set storage unit by using the address.

a band distribution parameter storage unit, configured to store the band distribution parameter of the model parameter, for example, storing the configuration of the parameter model shown in FIGS. 1(a) and 1(b), which is the band distribution parameter.

The quantization parameter model memory at the encoding end also includes a model parameter controller for controlling the change of the quantization model parameters. Typically, the controller can directly control the operation of reading information from the band parameter set storage unit, or indirectly control the operation of reading information from the band distribution parameter storage unit according to the address information in the parameter set address/index storage unit. The controller can also control the operation of reading information from the band distribution parameter storage unit.

Furthermore, the following points should be noted:

1. The above quantization parameter model memory can be placed at a storage module of the quantizer at the encoding end or be independent of the quantizer and configured as a separate storage unit at the encoding end;

2. It is obvious that the n number of band parameter set storage units can be discontinuously set in a physical memory. The starting address of a band parameter set storage unit can be easily addressed through the parameter set address/index storage unit;

3. Band distribution parameter storage unit, and the band parameter set storage unit or the band set address/index storage unit can be set in a physical memory continuously or discontinuously.

(2) Parameterized Weighting Quantization Processor

The Parameterized weighting quantization processor is configured to acquire the band parameter and the distribution parameter of the parameter model from the quantization parameter model memory at the encoding end and to compute the band weighting coefficient matrix, the quantization matrix or scaling matrix so as to accomplish the picture quantization at the encoding end. The processor specifically includes:

a band weighting coefficient computation unit, configured to computer the band weighting coefficient matrix according to the band parameter and the band distribution parameter stored in the quantization parameter model memory;

a quantization operation matrix computation and updating unit, configured to computer and update the current quantization operation matrix according to the band weighting coefficient matrix computed by the band weighting coefficient computation unit, where the quantization operation matrix could be a quantization matrix or a scale transforming matrix; the weighting operation on the quantization matrix or scale matrix includes but is not limited to arithmetic operations such as addition, subtraction, multiplication, division, shifting, filtering, and so on; and a quantization computation unit, configured to perform quantization on the picture data using the updated quantization operation matrix, which includes the updated quantization matrix or the updated scaling matrix.

(3) Model Bitstream Parameter Processor

The Model bitstream parameter processor is configured to convert the quantization model parameter used at the encoding end into a bitstream parameter suitable for storage in the encoded bitstream. The bitstream parameter is stored in a header of an encoding unit in the encoded bitstream. The processor includes specifically:

a model bitstream parameter processing unit, configured to read the parameter information stored in the current quantization parameter model memory at the encoding end, in which the parameter information includes band parameter values or the address/index of the band parameter storage unit, and the band distribution parameter values, and compute bitstream parameters suitable for storage in the bitstream according to the model parameter values having been read, for example, the above operations can be done via differential encoder or se(v) encoder; and a bitstream parameter storage unit, configured to write the bitstream parameter output by the model bitstream parameter processing unit into the header of an encoding unit, which includes but is not limited to a sequence header, a picture group header, a picture header, a slice header, a macroblock header and a block header, etc.

B. Parameterized Dequantizer at the Decoding End

The parameterized dequantizer is configured to perform the parameterized weighting dequantization at the decoding end, and includes a quantization parameter model memory, a parameterized weighting dequantization processor, and a quantization parameter model bitstream parameter processing unit, wherein:

(1) Quantization Parameter Model Memory

The quantization parameter model memory is configured to store model parameter information belongs to the quantization parameter model necessary at the decoding end, which includes specifically a plurality band parameter set storage unit, a parameter set unit address/index memory and a band distribution parameter storage unit.

The function and operation principle of the quantization parameter model memory at the decoding end is completely the same at that of the encoding end with the exception that, the quantization parameter model memory at the decoding end does not include the model parameter controller. The update control of the model parameter information in the quantization parameter model memory is subject to the computed result from the model bitstream parameter processor.

(2) Parameterized Weighting Dequantization Processor

The parameterized weighting dequantization processor is configured to extract the frequency band weighting parameters and the band distribution parameter corresponding to the parameter model from the quantization parameter model memory at the decoding end, and compute the band weighting coefficient matrix, the dequantization matrix or the descaling matrix so as to accomplish dequantization on the encoded picture data at the decoding end. The dequantized picture data is fed to a next unit such as an inverse transform unit in the image decoder.

The parameterized weighting dequantization processor includes specifically:

a band weighting coefficient computation unit, configured to compute the band weighting coefficient matrix according to the band parameter and the band distribution parameter in the quantization parameter model memory;

a dequantization operation matrix computation and updating unit, configured to compute and update the current dequantization matrix according to the band weighting coefficient matrix, where dequantization operation matrix could be a dequantization matrix or a descaling matrix. The method weighting on the dequantization matrix or descaling matrix includes but is not limited to arithmetic operations of addition, subtraction, multiplication, division, shifting, filtering, etc.; and a dequantization computation unit, configured to perform dequantization on picture data to be decoded using the updated dequantization matrix, wherein the dequantization matrix could be a dequantization matrix or a descaling matrix.

(3) Model Bitstream Parameter Processor

The model bitstream parameter processor is configured to read the bitstream parameter information for the quantization parameter model stored in the encoded bitstream, convert the bitstream parameters to the quantization model parameters and feed into the quantization parameter model memory for updating or buffering.

The model bitstream parameter processor includes specifically:

a bitstream parameter reading unit, configured to read bitstream parameters from the header of an encoding unit of the received bitstream. The header of the encoding unit includes but is not limited to a sequence header, a picture group header, a picture header, a slice header, a macroblock header or a block header etc; and a model bitstream parameter processing unit, configured to convert the model bitstream parameter read by the bitstream parameter reading unit to the model parameters, wherein the model parameters include the band parameter values or index of the band parameter and band distribution model parameter values. The converted quantization model parameter values are then sent to the quantization parameter model memory for updating or buffering.

The convertor of decoder end should correspond to that of the encoder end, and for example, can be a differential decoder or a se(v) decoder corresponding to the differential encoder or the se(v) encoder at encoder end, respectively.

In summary, according to the embodiments of the present invention, by replacing the quantization matrix model with the parameterized weighting quantization model, it is possible to quantize the picture transformed coefficients in the form of parameterized weighting quantization. Thereby, a quantization matrix conforming to the human vision system can be obtained by controlling several model parameters; thus, the user can control the quality of the encoded image by means of several model parameters instead of the entire coefficients of quantization matrix. Moreover, there is no need to store a large amount of quantization matrix information in the bitstream, instead, only several corresponding parameter information is stored. As a result, the encoding efficiency is significantly improved. Meanwhile, the quantization of the picture transformed coefficients can be done by using several model parameters; thus, quantization operation can easily adapt to the content of the picture. In other words, at the same encoding bitrate, the detail of the picture is remained after quantization and thereby the subjective picture quality of encoded picture is improved.

In conclusion, the method and apparatus according to the embodiments of the present invention have the following advantages:

1. At the same encoding bitrate, a quantization parameter model coding technology can preserve detailed information of the picture and improve the subjective quality of the encoded picture;

2. The user can flexibly control the subjective picture quality; and

3. A method of acquiring the quantization matrix in the lower level encoding unit by using a few bits in the higher level encoding unit of bitstream structure is provided. It also saves bit and improves the encoding efficiency.

Moreover, it is proved by experiment that, under the same encoding bitrate, the subjective picture quality is significantly improved by using the method according to the embodiments of the present invention.

The above description is only preferred embodiments of the disclosure, and is not intended to limit the scope of the disclosure. Any modification, equivalent substitution and improvement within the spirit and scope of the disclosure are intended to be included in the scope of the disclosure.

What is claimed is:

1. A method performed by an encoding device in a network for encoding picture data, comprising:
receiving image data and an initial quantization matrix for encoding the image data;
converting the initial quantization matrix into a modified scaling matrix having identical dimensions as the initial quantization matrix, wherein the modified scaling matrix has a plurality of coefficients divided into different frequency bands and a number of the frequency bands is smaller than a number of coefficients in the modified scaling matrix, and wherein each frequency band is assigned one scaling value such that every coefficient of said each frequency band has the scaling value assigned to said each frequency band;

performing quantization on the image data using the modified scaling matrix in a process of encoding to generate encoded image data;

generating a parameter set having multiple band parameters, each band parameter corresponding to a coefficient of the modified scaling matrix; and writing the encoded image data and the parameter set having the multiple band parameters into a bitstream; and transmitting the bitstream over the network to a decoding device.

2. The method of claim 1, wherein the modified scaling matrix comprises at least one of the following items:
a transformed coefficient matrix, a quantization matrix, a scaling transform matrix, and a transform matrix having bands correspondence with the transformed coefficient matrix and quantization matrix.

3. The method of claim 1, further comprising:
assigning a band distribution parameter corresponding to a distribution configuration of the coefficients in the modified scaling matrix, and performing the corresponding quantization operation in the process of encoding respectively using the modified scaling matrix and the band distribution parameter.

4. The method of claim 1, wherein the modified scaling matrix comprises the coefficients of positive weighting and negative weighting, the positive weighting indicates that a frequency component is enhanced after being weighted with the coefficients, and the negative weighting indicates that a frequency component is reduced after being weighted with the weighting coefficient.

5. The method of claim 1, further comprising:
establishing the modified scaling matrix by computation by using scaling value coefficients.

6. The method of claim 1, further comprising:
establishing the modified scaling matrix by computation by using an arithmetic operation of addition, subtraction, multiplication, division, shifting, filtering or their combinations.

7. The method of claim 1, further comprising:
generating a set of parameters according to the modified scaling matrix, writing the set of parameters into a header of an encoding unit and the encoding unit comprises a sequence, a picture group, a picture, a slice or a macroblock.

8. An apparatus for performing encoding on picture data, comprising:
a non-transitory memory storing executable instructions; and
a processor coupled to the memory that reads and executes the instructions to carry out operations of:
receiving image data and an initial quantization matrix for encoding the image data;
converting the initial quantization matrix into a modified scaling matrix having identical dimensions as the initial quantization matrix, wherein the modified scaling matrix has a plurality of coefficients divided into different frequency bands and a number of the frequency bands is smaller than a number of coefficients in the modified scaling matrix, and wherein each frequency band is assigned one scaling value such that every coefficient of said each frequency band has the scaling value assigned to said each frequency band;

performing quantization on the image data using the modified scaling matrix in a process of encoding to generate encoded image data;

writing the encoded image data and the parameter set having the multiple band parameters into a bitstream for the image; and transmitting the bitstream over the network to a decoding device.

9. The apparatus of claim 8, wherein the processor is further configured to write the parameter set into a header of the bitstream for transmitting the image.

10. The apparatus of claim 8, wherein the memory further stores a band distribution parameter corresponding to a distribution configuration of the scaling values in the modified scaling matrix, and the parameter set includes the band distribution parameter.

11. An apparatus for decoding encoded picture data, comprising:
a non-transitory memory storing executable instructions;
a processor executing the executable instructions to perform operations of:
receiving encoded picture data and a parameter set having multiple band parameters in a bitstream transmitted over the network;
establishing a scaling matrix with the set of parameters with each band parameter corresponding to a plurality of coefficients of the scaling matrix;
decoding the received encoded picture data with the scaling matrix, wherein the scaling matrix is divided into the plurality of coefficients for different frequency bands; wherein a number of the frequency bands is smaller than a number of the plurality of coefficients in the scaling matrix;
and
performing dequantization on the received encoded picture data using the scaling matrix in a process of decoding the encoded picture data.

12. The apparatus of claim 11, wherein the memory further stores a band distribution parameter corresponding to a distribution configuration of the coefficients in the scaling matrix, and each set of the parameters for one configuration of the distribution of band parameter in the scaling matrix is stored individually.

13. A method performed by a decoding device in a network for decoding picture data, comprising:
receiving encoded picture data and a parameter set having multiple band parameters in a bitstream transmitted over the network;
establishing a scaling matrix with the set of parameters with each band parameter corresponding to a plurality of coefficients of the scaling matrix;
decoding the received encoded picture data with the scaling matrix, wherein the scaling matrix is divided into the plurality of coefficients for different frequency bands; wherein a number of the frequency bands is smaller than a number of the plurality of coefficients in the scaling matrix and
performing dequantization on the received encoded picture data using the scaling matrix in a process of decoding the encoded picture data.

\* \* \* \* \*